US008866612B1

(12) United States Patent
Foster (10) Patent No.: US 8,866,612 B1
(45) Date of Patent: Oct. 21, 2014

(54) SUPPRESSING ALERTS FOR RFID SYSTEMS

(71) Applicant: Target Brands, Inc., Minneapolis, MN (US)

(72) Inventor: Robert F. Foster, Ramsey, MN (US)

(73) Assignee: Target Brands, Inc., Minneapolis, MN (US)

( * ) Notice: Subject to any disclaimer, the term of this patent is extended or adjusted under 35 U.S.C. 154(b) by 105 days.

(21) Appl. No.: 13/715,144

(22) Filed: Dec. 14, 2012

(51) Int. Cl.
*G08B 13/14* (2006.01)

(52) U.S. Cl.
USPC .................. 340/568.1; 340/572.1; 705/28

(58) Field of Classification Search
USPC ............. 340/568.1, 571, 572.1, 572.4, 539.1, 340/539.11, 5.2, 5.92; 235/462, 462.01; 705/22, 28; 177/50, 128, 185
See application file for complete search history.

(56) References Cited

U.S. PATENT DOCUMENTS

| | | | |
|---|---|---|---|
| 4,120,004 A | 10/1978 | Coutta | |
| 4,819,015 A * | 4/1989 | Bullivant et al. | 340/568.8 |
| 5,074,368 A * | 12/1991 | Bullivant | 177/50 |
| 5,920,261 A | 7/1999 | Hughes et al. | |
| 5,969,755 A | 10/1999 | Courtney | |
| 6,424,370 B1 | 7/2002 | Courtney | |
| 6,662,068 B1 | 12/2003 | Ghaffari | |
| 6,804,578 B1 | 10/2004 | Ghaffari | |
| 6,909,356 B2 | 6/2005 | Brown et al. | |
| 7,123,146 B1 | 10/2006 | Holzman | |
| 7,167,576 B2 | 1/2007 | Steenburgh et al. | |
| 7,168,618 B2 | 1/2007 | Schwartz | |
| 8,321,302 B2 * | 11/2012 | Bauer et al. | 705/28 |
| 8,325,036 B1 | 12/2012 | Fuhr et al. | |
| 2003/0216969 A1 | 11/2003 | Bauer et al. | |
| 2004/0111454 A1 | 6/2004 | Sorensen | |
| 2006/0149566 A1 | 7/2006 | Lin | |
| 2007/0013776 A1 | 1/2007 | Venetianer et al. | |
| 2007/0016494 A1 * | 1/2007 | Brown et al. | 705/28 |
| 2007/0165931 A1 | 7/2007 | Higaki | |
| 2007/0182818 A1 | 8/2007 | Buehler | |
| 2007/0229272 A1 | 10/2007 | Cash et al. | |
| 2008/0074496 A1 | 3/2008 | Venetianer et al. | |
| 2008/0246613 A1 | 10/2008 | Linstrom et al. | |

(Continued)

FOREIGN PATENT DOCUMENTS

WO    2007024639 A2    3/2007

OTHER PUBLICATIONS

U.S. Appl. No. 12/201,903.

(Continued)

*Primary Examiner* — Van T. Trieu
(74) *Attorney, Agent, or Firm* — Merek, Blackmon & Voorhees, LLC (57) ABSTRACT

A value is stored in memory indicating that an alert is to be issued if more than a threshold quantity of an item is moved out of a location. Instructions to employees to remove more than the threshold quantity of the item from the location are also stored in memory. A signal from at least one sensor is received indicating that an item has been moved out of the location. At least one of an identifier for the item and an identifier for the location is used to locate the instructions to remove more than the threshold quantity of the item from the location. In response to locating the instructions, an alert that would otherwise be issued because more than the threshold quantity of the item was removed from the location is suppressed.

20 Claims, 11 Drawing Sheets

(56) References Cited

U.S. PATENT DOCUMENTS

2009/0091452 A1    4/2009   Himmel
2011/0072132 A1    3/2011   Shafer et al.
2013/0144757 A1*   6/2013   Bauer et al. ................ 705/26.61

OTHER PUBLICATIONS

Active Shelf System, Barcoding Incorporated, http://barcoding.com/rfid/active-shelf.shtml, 2 pages, Nov. 2, 2012.
Koh et al., White Paper, Prediction, Detection, and Proof: An Integrated Auto-ID Solution to Retail Theft., Jun. 1, 2003, 19 pages.

* cited by examiner

| 502 | 504 | 506 | 508 | 510 | 512 | 514 | 516 |
|---|---|---|---|---|---|---|---|
| TASK ID | TASK ASSIGNED DATE | TASK STARTED DATE-TIME | TASK COMPLETED DATE-TIME | TASK LOCATION | TASK ITEM | TASK INSTRUCTION | EMPLOYEE |
| 2517 | 10/01/12 | 10/01/12-8:32 | 10/01/12-9:30 | SHOES | SANDALS | REMOVE ALL SANDALS | MARY SMITH |
| 2518 | 10/01/12 | 10/01/12-9:00 | | TOYS | PUZZLES | MOVE TO END OF AISLE | JOE JONES |
| 2519 | 10/01/12 | | | AISLE 5 | BRAND "A" LIPSTICK | MOVE TO AISLE 7 | |
| 2520 | 10/01/12 | | | SHELF 2 | SHORTS | REMOVE | |

SUPPRESSING ALERTS FOR RFID SYSTEMS

BACKGROUND

Radio frequency identification (RFID) uses a tag on a piece of merchandise to emit a radio frequency signal containing identifying information for the piece of merchandise. The radio signal is received by a sensor that is able to decode the merchandise identifier and is able to send the identifier to one or more servers to indicate the location and the identity of the merchandise. The sensors may be positioned in fixed locations or may be positioned on movable vehicles or devices such as handheld devices.

The discussion above is merely provided for general background information and is not intended to be used as an aid in determining the scope of the claimed subject matter. The claimed subject matter is not limited to implementations that solve any or all disadvantages noted in the background.

SUMMARY

A value is stored in memory indicating that an alert is to be issued if more than a threshold quantity of an item is moved out of a location. Instructions to employees to remove more than the threshold quantity of the item from the location are also stored in memory. A signal from at least one sensor is received indicating that an item has been moved out of the location. At least one of an identifier for the item and an identifier for the location is used to locate the instructions to remove more than the threshold quantity of the item from the location. In response to locating the instructions, an alert that would otherwise be issued because more than the threshold quantity of the item was removed from the location is suppressed.

In accordance with further embodiments, instructions stored on a non-transitory storage medium are executed by a processor that cause the processor to perform steps including receiving a signal from at least one sensor indicating that an item is no longer within an area. The processor then uses an identifier for the item to search a memory for plans to remove more than a specified number of the item from the area. In response to locating the plans, the processor does not send an alert that would otherwise be sent because more than the specified number of the item was removed from the area.

In accordance with still further embodiments, a system includes a handheld device, a sensor and a server. The handheld device transmits an indication that an employee has checked out an item. The sensor detects whether an item is in an area and transmits information indicating that the item is not in the area. The server receives the indication that an employee has checked out the item, stores the indication that the employee has checked out the item in memory, receives the information indicating that the item is not in the area, accesses the memory to determine if an employee has checked out the item, and because the employee has checked out the item, suppresses an alert that would otherwise be sent.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Using RFID tags placed on merchandise, it is possible to send an alert to security personnel when a large number of items leave a particular area. Often the movement of a large number of items from an area is indicative of theft. However, there are times when employees will move large numbers of items from one location to another within a store. Various embodiments described below interrogate databases to determine if a detected movement of items was expected. If the detected movement was expected, an alert that would otherwise be issued is suppressed. The suppression is limited to merchandise that was expected to be moved. If other merchandise in the same location is moved and the movement was not expected, an alert will be issued for the other merchandise.

Figure 1:
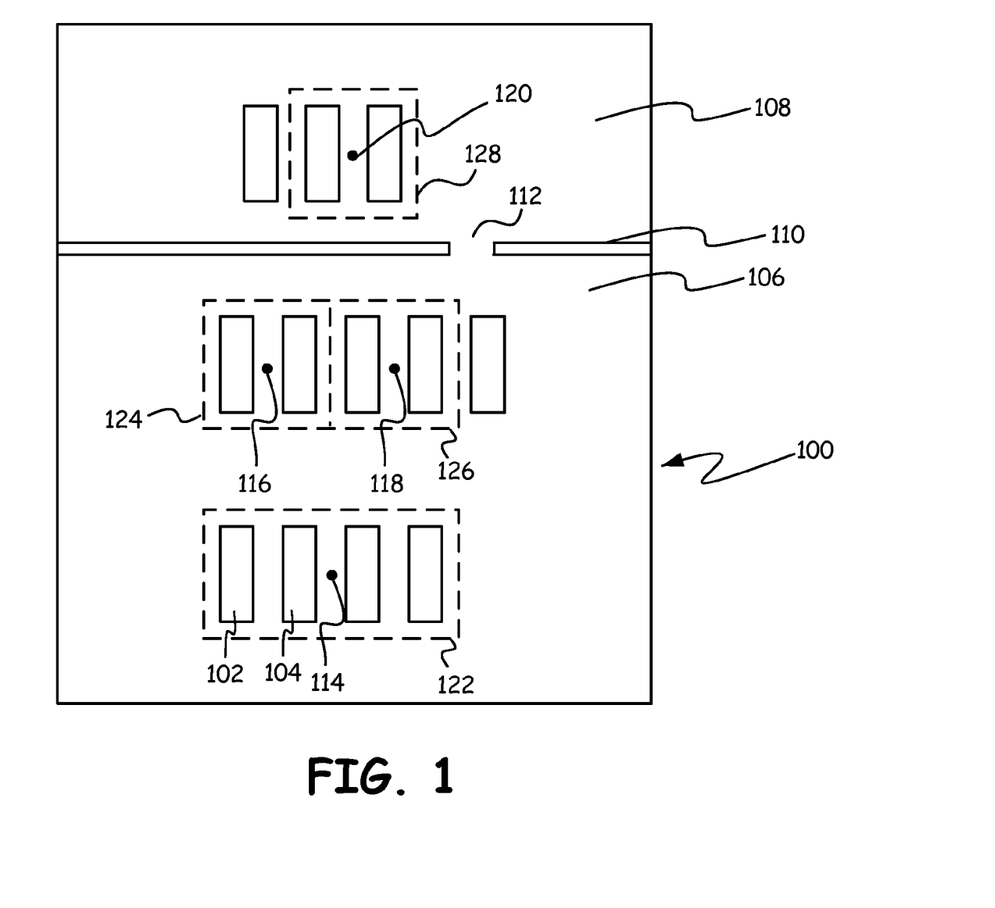
FIG. 1 is a schematic plan view of a layout of shelving in a retail environment showing RFID sensor areas.

FIG. 1 provides a schematic plan view of a store layout 100 containing multiple display units in a retail area 106 and a back room area 108. Retail area 106 and back room area 108 are separated by a wall 110 with an opening 112. A limited number of display units, such as display units 102 and 104, are shown in FIG. 1 for simplicity and those skilled in the art will recognize that more display units may be used. Further, the embodiments described herein are not limited to parallel rows of display units and any distribution or orientation of display units may be used. Further, different types of display units may be used with the embodiments described below including shelves, gondolas, circular racks, peg hooks, end of aisle displays, and free standing merchandise.

The store includes one or more sensors such as RFID sensors 114, 116, 118 and 120. Each sensor has a sensing area shown in dotted lines such as sensing area 122 for sensor 114, sensing area 124 for sensor 116, sensing area 126 for sensor 118 and sensing area 128 for sensor 120. In FIG. 1, the sensor areas are shown as squares or rectangles, however those skilled in the art will recognize that the sensor areas may also be circles or other shapes depending on the physical structures present in the store which block or interfere with the transmission of radio frequency signals. In addition, although the sensing areas are shown as being distinct from each other in FIG. 1, those skilled in the art will recognize that the sensing areas can overlap. Although only four sensors and sensor areas are shown in FIG. 1, those skilled in the art will recognize that additional sensors and sensor areas may be provided.

Each sensor is able to receive a radio signal from RFID tags within their respective sensing areas. Typically, each piece of merchandise in the sensing area has a respective RFID tag that is attached to the merchandise by way of adhesive or a plastic tie or that is fixed within the packaging of the merchandise.

In accordance with many embodiments, sensors 114, 116, 118 and 120 periodically scan for radio frequency IDs within their sensor area. In embodiments where the RFID tags have their own internal power source, known as active tags, the scanning for radio frequency IDs involves demodulating radio frequency signals to detect signals containing merchandise information. In embodiments where the RFID tags do not have their own internal power source, scanning involves first generating an outbound radio frequency signal which activates RFID tags within the sensor area and thereby causes the tags to emit a radio frequency signal containing identification information. The sensor then demodulates the radio frequency signals from the RFID tags to extract the merchandise information.

Figure 2:
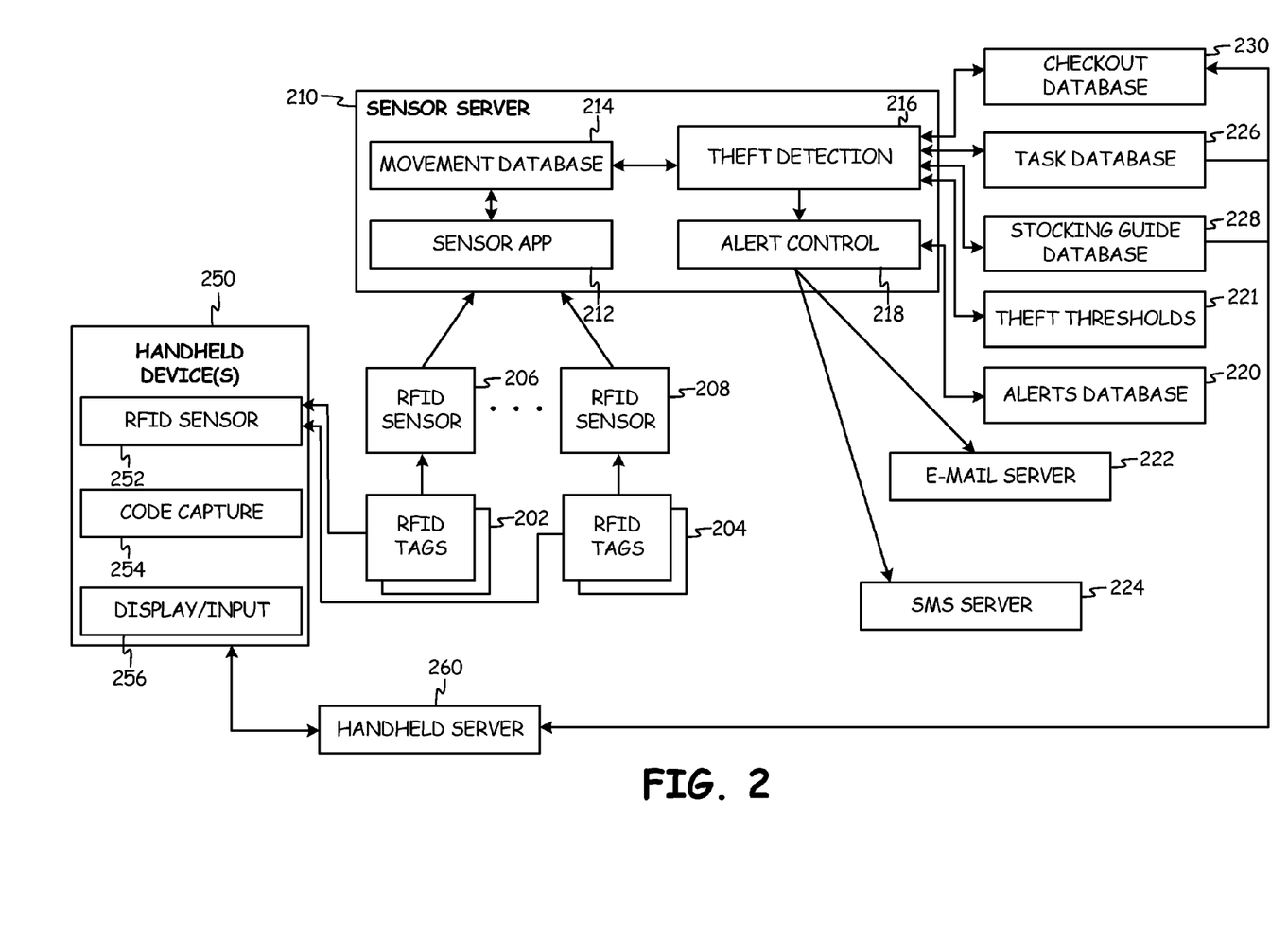
FIG. 2 is a block diagram of elements used in suppressing alerts based on detected movement of merchandise.

FIG. 2 provides a block diagram of elements used to detect movement of merchandise using RFID sensors and to suppress alerts that would otherwise be issued in response to such movement. In FIG. 2, there is a set or collection of RFID sensors represented by RFID sensor 206 and RFID sensor 208. Each RFID sensor has a respective sensor area containing a respective set or collection of RFID tags. For example, RFID sensor 206 has a sensor area that contains a collection of RFID tags 202 and RFID sensor 208 has a sensor area that contains a collection of RFID tags 204. Note that although RFID tag collections 202 and 204 are shown as being separate, in other embodiments, some RFID tags may be in both tag collections.

RFID sensors 206 and 208 receive radio signals from the RFID tags in their respective sensing areas, demodulate the received signals and extract merchandise-identifying information from the signals. This merchandise-identifying information can include a merchandise ID for each RFID tag that uniquely identifies the merchandise associated with the tag. The detected merchandise ID values are provided by RFID sensors 206 and 208 to a sensor application 212 on a sensor server 210 along with an identifier for the RFID sensor itself. Sensor application 212 updates movement database 214 to add or update an entry indicating the date and time that the RFID tags were sensed by each of the RFID sensors. Thus, movement database 214 provides a record of when a piece of merchandise was in the sensing area associated with an RFID sensor.

Periodically, a theft detection unit 216 interrogates movement database 214 to identify items that have left a sensor area. In particular, theft detection unit 216 looks for items that were present in a location in a preceding update of movement database 214 but were not present when sensor application 212 last updated movement database 214. Theft detection unit 216 compares the number of items that were removed from the location to a theft threshold quantity 221 stored in memory. Theft threshold quantity 221 can be a single value that is common to all items in a retail setting or can be a value that is specific to each item in the retail setting such that different items can have different theft threshold quantities. If the number of items that were removed exceeds the theft threshold quantity and theft detection unit 216 does not determine that the movement was planned, theft detection unit 216 will notify an alert control 218 about the movement. Alert control 218 consults an alerts database 220 to determine what type of alert should be issued based on the movement. Based on the type of alert stored in alerts database 220, alert control 218 may instruct e-mail server 222 or short messaging service (SMS) server 224 to issue e-mails or messages that will alert security personnel about the movement of the merchandise.

Figure 3:
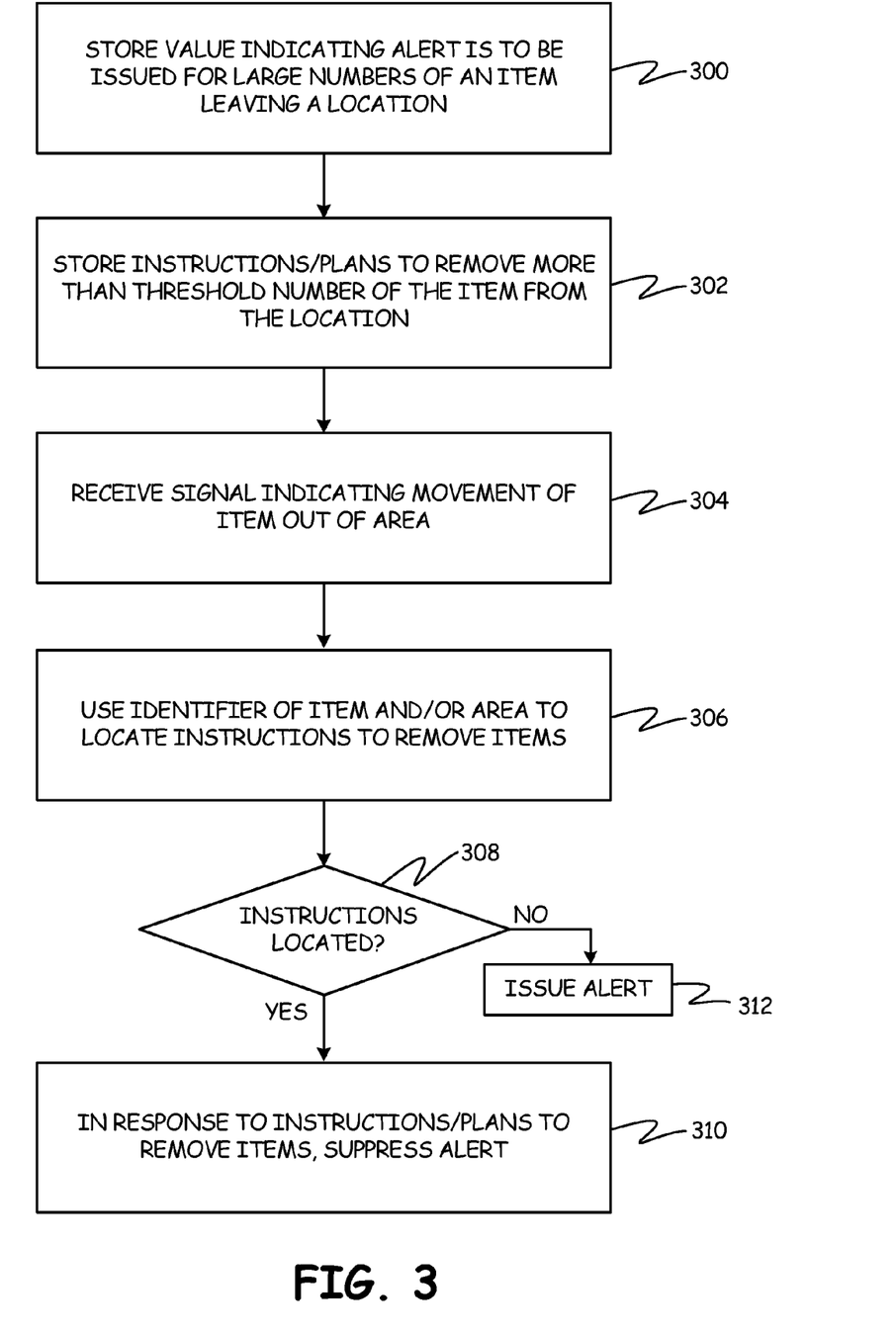
FIG. 3 is a flow diagram of a method of suppressing alerts.

Various embodiments are provided that cause theft detection unit 216 and/or alert control 218 to suppress the issuance of an alert if the movement of the merchandise is planned. FIG. 3 provides a flow diagram of one such embodiment.

In step 300, alerts database 220 is populated with a value indicating that an alert is to be issued if more than the theft threshold quantity of a particular item leaves a sensing area. At step 302, instructions or plans to remove more than the threshold quantity of the item from the location are stored. These instructions or plans can be stored in a task database 226, a stocking guide database 228 or a checkout database 230, as discussed more fully below.

At step 304, sensor server 210 receives an indication of movement of items out of an area. In particular, sensor server 210 receives radio frequency IDs from an RFID sensor, such as RFID sensors 206 and 208, indicating that particular RFID tags are no longer present in the sensor areas of the RFID sensor. This indicates that the merchandise containing the RFID tags has moved out of the sensor area. At step 306, theft detection unit 216 uses the merchandise identifiers for the items that have been moved out of the sensor area to locate plans or instructions to remove items from the area. In other embodiments, theft detection unit 216 uses the area where the items should be present to determine if there are any plans or instructions to remove items from the area. Thus, theft detection unit 216 can use either the identifiers of the items or an identifier for the sensor area or both to search stocking guide database 228, task database 226 and/or checkout database 230 to locate instructions to remove more than the theft threshold quantity of items from the sensor location.

As discussed further below, task database 226 provides a list of tasks that are to be performed in the store on a given date or within a particular date range. Such tasks can include moving items from one location to another or removing items from the store completely. As also described further below, stocking guide database 228 provides a description of items that are to be stocked within a particular location within a store. Stocking guide database 228 indicates that an item is to be moved from a location by not including the item as one of the items to be stocked in that location. Checkout database 230, as described further below, contains a list of items that have been checked out by an employee so that they will not trigger an alert.

If theft detection unit 216 locates instructions or plans to remove the item(s) from the location at step 308, theft detection unit 216 and/or alert control 218 suppress issuance of the alert at step 310. An alert is suppressed by theft detection unit 216 simply by not notifying alert control 218 about the movement of the items or the plans to move the items. When alert control 218 suppresses an alert, it receives the information about the movement of the items and the plans to move the items from theft detection unit 216 and then uses that information and information in alerts database 220 to determine whether the planned movement is sufficient to suppress the alert for those items.

If theft detection unit 216 does not identify instructions or plans to move an item from a sensor area, the alert is not suppressed and instead is issued at step 312 by alert control 218. The particular form of the issued alert is controlled by settings in alerts database 220 and can, for example, include sending an e-mail to e-mail server 222 or a message through SMS server 224. Note that for a single location, instructions or plans may be present for moving one class of item from the location but not another class of item. Thus, it is possible that alerts will be suppressed for one item in a sensor location while alerts for other items in the same location are not suppressed.

Figure 4:
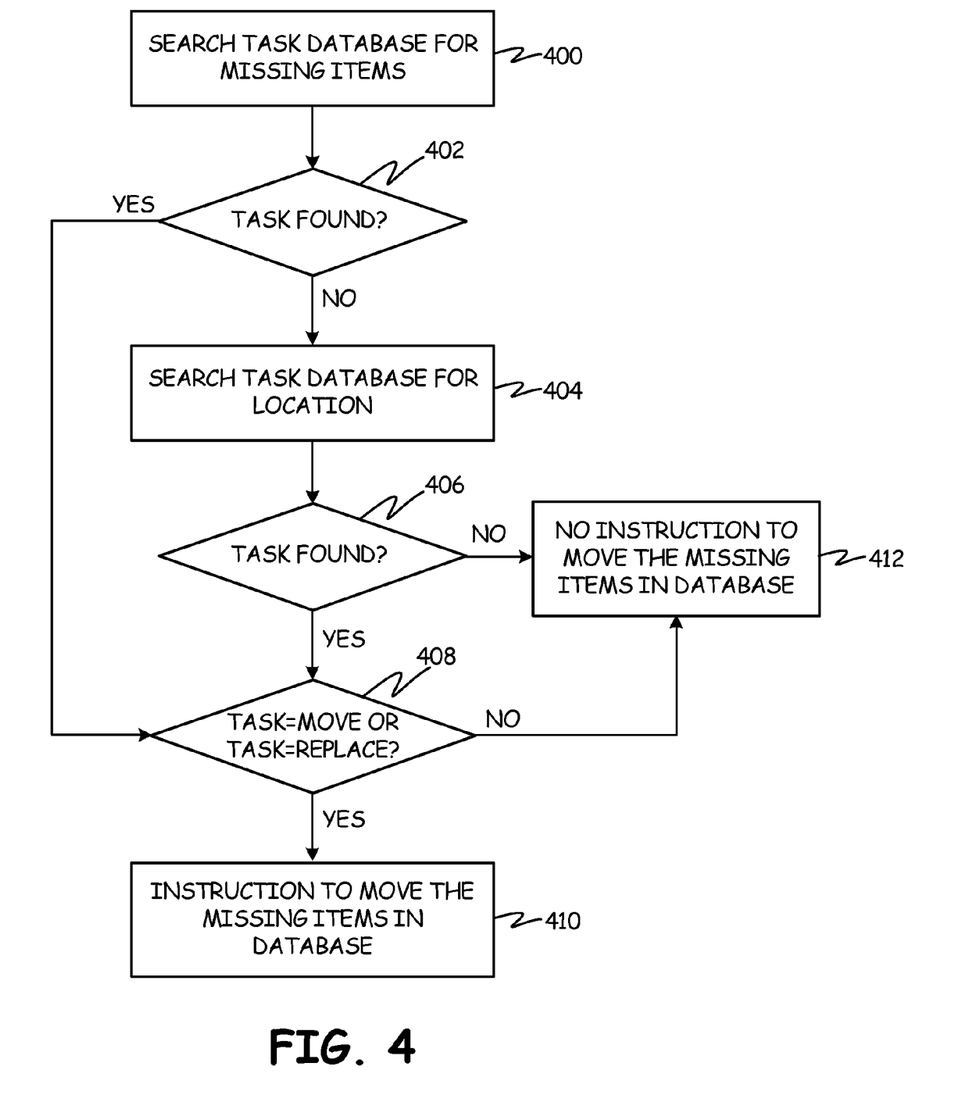
FIG. 4 is a flow diagram for locating tasks describing movement of merchandise.

FIG. 4 provides a more detailed flow diagram of step 306 of FIG. 3. In particular, FIG. 4 shows steps for locating instructions to move items in task database 226.

In step 400 of FIG. 4, theft detection unit 216 searches task database 226 to see if an assigned task lists any of the items that have been moved from the area.

Figure 5:
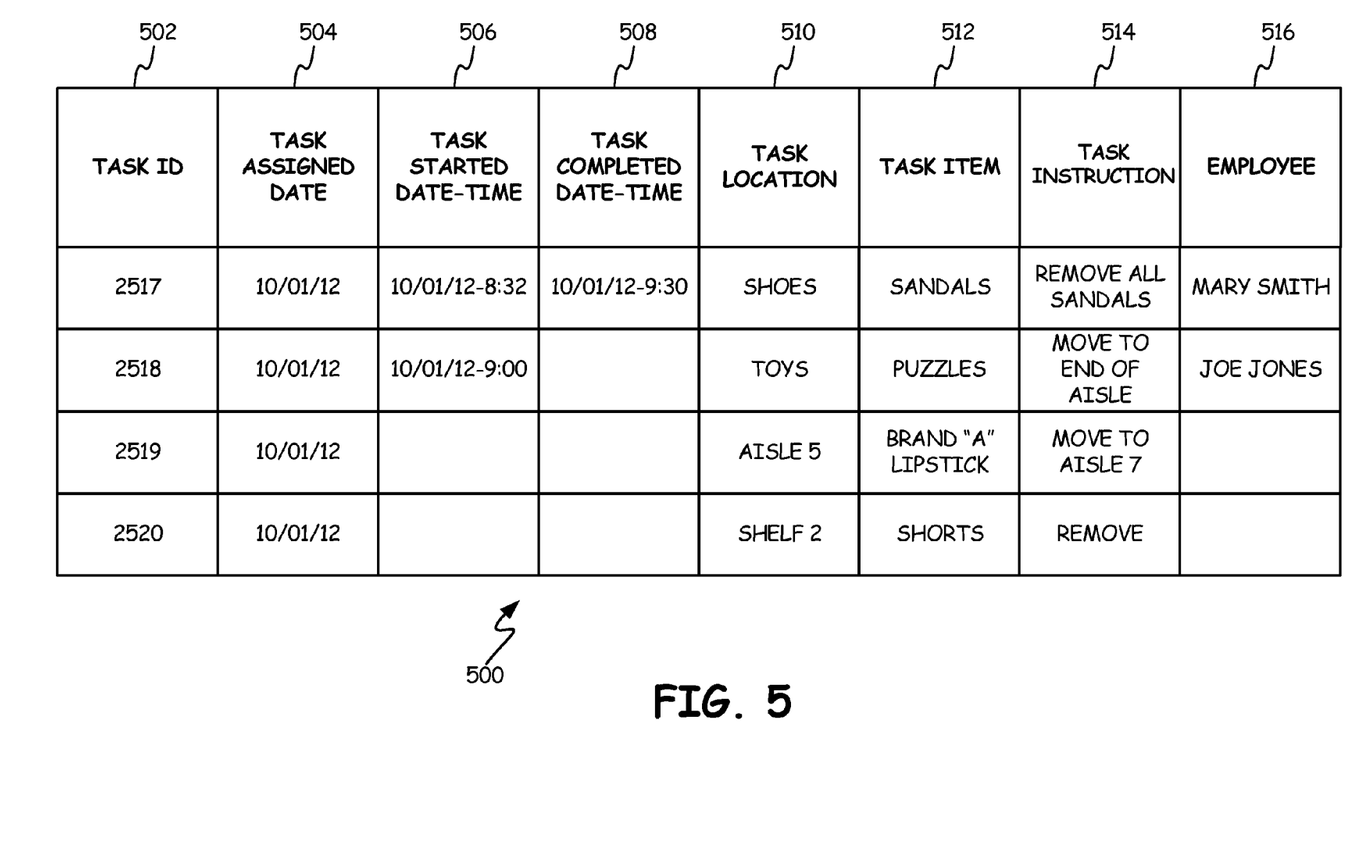
FIG. 5 is an example of a database table for scheduled tasks.

FIG. 5 provides an example 500 of task database 226. Example task database 500 includes a task ID field 502, task assigned date field 504, task started date field 506, task completed date field 508, task location field 510, task item field 512, task instruction field 514 and task employee field 516. Task ID field 502 provides a unique identifier for a task. Task assigned date field 504 indicates the date on which the task was scheduled to be performed. Task start date field 506 indicates a date and time when an employee began the task. Task completed date field 508 includes a date and time when the task was complete. Task location 510 indicates an area of the store impacted by the task. This location may be designated as a department within the store such as shoes or toys or alternatively may by designated as an aisle or shelf within the store such as "Aisle 5" or "Shelf 2". Task item 512 indicates an affected by the task and may include an identifier for a specific instance of a product, such as "Serial No. 45062934 of Brand A, Style B lipstick", an identifier for a product, such as "Brand A, Style B lipstick", an identifier for a brand of product, such as "Brand A Lipstick", or an identifier for a general category of merchandise, such as "Lipstick." Task instructions 514 provide a description of the task to be performed such as removing items from the location, moving items from one location to another location or restocking items within the same location. Employee column 516 indicates an employee who has been assigned a task or who has begun to execute the task.

In step 400 of FIG. 4, the task database is searched for the items that theft detection unit 216 has determined are missing from the location. In particular, the missing items are searched for in task item field 512. This search involves looking for the unique identifiers of the individual items as well as categories and classes of items that the missing items fall within. For example, if a missing item was a Brand X sandal with serial number 456789, the search would include looking for an identifier for a Brand X sandal with serial number 456789, and identifier that covers all Brand X sandals, an identifier that covers all sandals, and an identifier that covers all footwear. A search may be further limited to tasks that are assigned to be performed on the current day or to tasks that an employee has indicated they have started. If the search is limited to tasks that an employee has indicated they have started, the search will indicate that no instructions to remove the item were located even if the task database indicates that a task to remove the item has been assigned. Thus, in this case, the alert will only be suppressed if a value associated with the instructions indicates that an employee has indicated that they are executing the instructions.

If a task is not found at step 402 by searching the task database for the missing items, a second search of the task database is performed based on the sensor area at step 404. This involves searching task location field 510 for the location or locations covered by the sensor area of the RFID sensor. This search may involve searching for a department name associated with the sensor area or searching for aisle identifiers or shelf identifiers that are within the sensor area. If a task is found for the RFID sensor area, the task items found in field 512 for the matching entry are examined to see if they include the missing items. For example, if the task area was a particular shelf and the missing items were known to previously be on that shelf and the task item field included the keyword "all", the search at step 404 would be deemed to have found a task for the missing items. However, if the task items listed in task item field 512 are not inclusive of the missing items, the search for a task at step 404 would be deemed to not have found a task for the missing item.

If a task is found at either step 402 or step 406, task instruction field 514 is examined at step 408 to determine if the task involves moving or removing items from the sensor area. If the task involves moving or removing items, the process of FIG. 4 returns an indication that there are instructions to move the missing items in task database at step 410. If the task does not involve moving or removing the missing items or if no task can be found after step 406, an indication that there are no instructions to move the missing items in the task database is returned at step 412.

Figure 6:
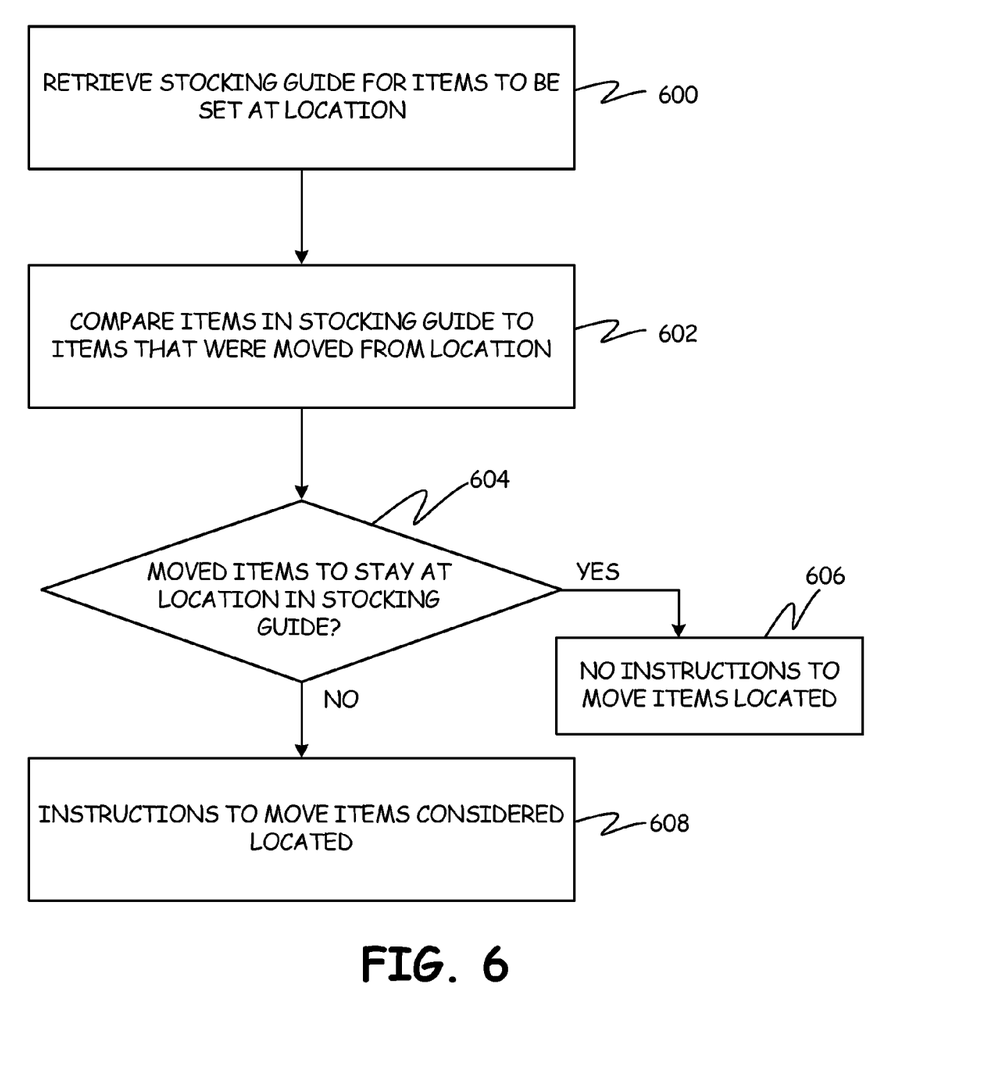
FIG. 6 is a flow diagram of a method of determining plans to move items based on a stocking guide.

FIG. 6 provides an alternative method for locating instructions to remove items. In FIG. 6, a stocking guide is used to identify the instructions to remove items. In step 600, the locations associated with the RFID sensor is used to search stocking guide database 228 to locate and retrieve one or more stocking guides for merchandise to be set at the locations.

Figure 7:
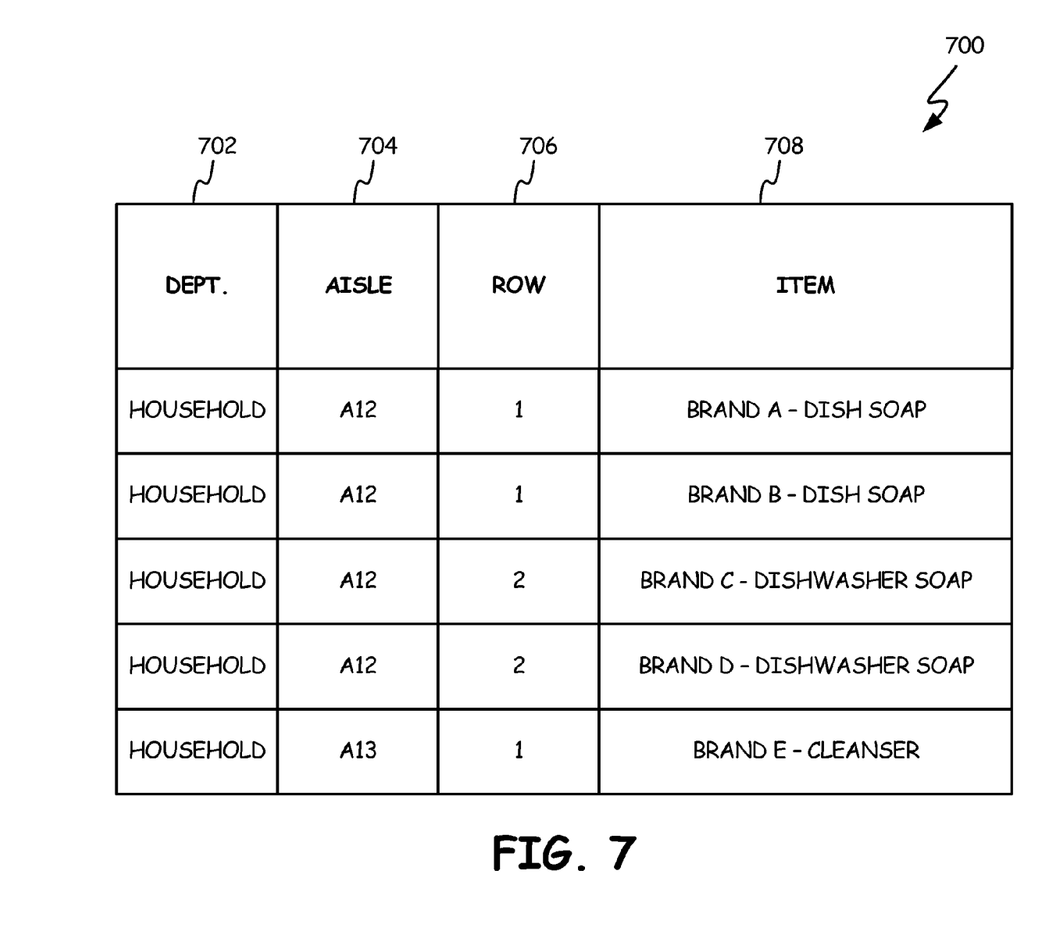
FIG. 7 is an example of a stocking guide database.

FIG. 7 provides an example of a stocking guide 700. Stocking guide 700 includes a department field 702, an aisle field 704, a row field 706 and an item field 708. Department field 702, aisle field 704 and row field 706 together define a location for an item under the stocking guide. Item field 708 lists individual items. In other embodiments, stocking guide 700 is a planogram that provides both a list of items to be stocked in the location and a description, either textual or visual, of how the items in the list are to be positioned at the location.

At step 602, the item or items that were removed from the locations supported by the RFID sensor are compared to the items in the stocking guide for those locations. If, at step 604, the items that were moved are designated in the stocking guide as remaining in the locations supported by the RFID sensor, theft detection unit 216 concludes that no instructions to move the items were located at step 606. If, however, the moved items are not designated as being in the locations supported by the RFID sensor under the new stocking guide at step 604, theft detection unit 216 concludes instructions to move the items out of the location have been found in the stocking guide at step 608. Thus, under FIG. 6, failing to find an item in a stocking guide for a location is considered to be an instruction to move the item out of the location. This follows from the fact that if an item is not present in a stocking guide, employees must remove the item from the location so that other items in the stocking guide can be placed at that location. Under this situation, alerts that would otherwise be triggered because items are removed from the location are suppressed.

Figure 8:
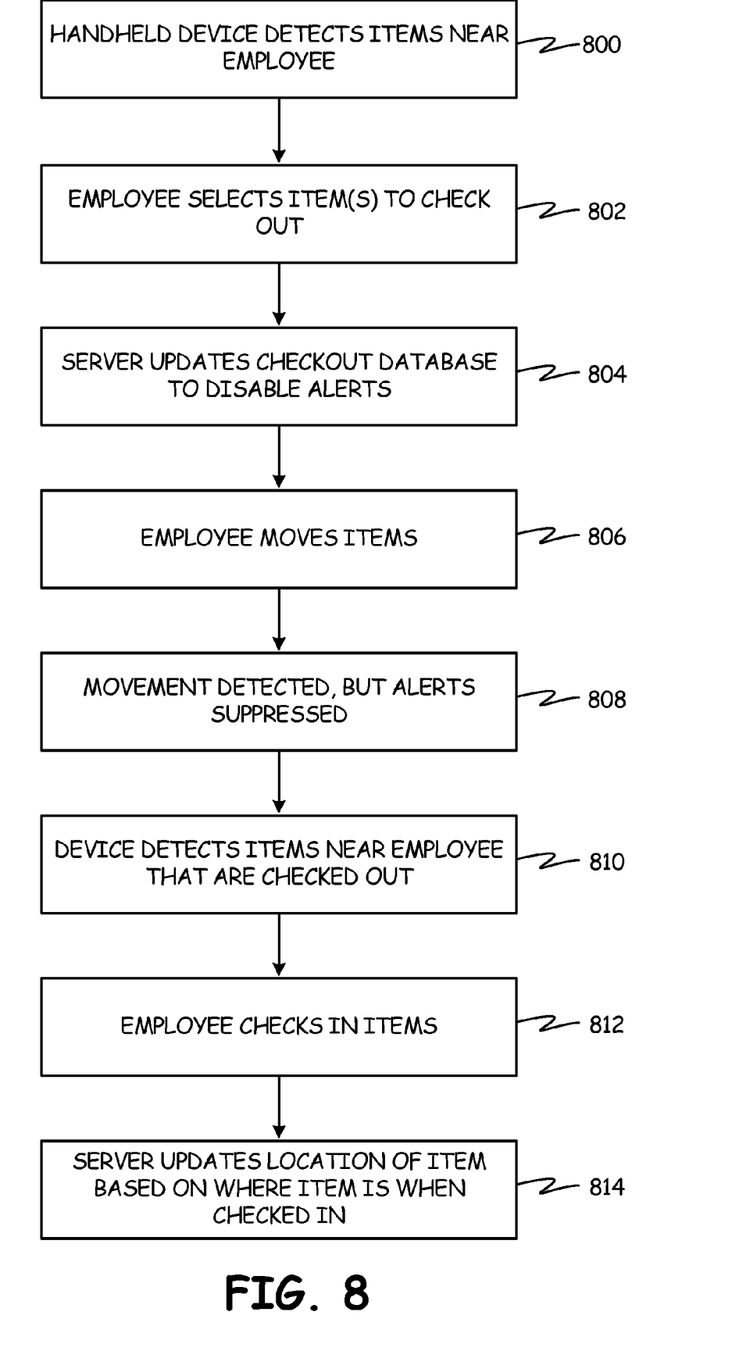
FIG. 8 is a flow diagram of a method of checking out merchandise to suppress alerts.

FIG. 8 provides an alternative technique for suppressing alerts that would otherwise be issued if items are removed from a sensor area. This alternative technique utilizes a system of checking items in and out. In this context, checking out an item means designating that movement of the item should not trigger alerts and checking an item in means that the new location for the items should be designated as its proper location and that alerts may once again be triggered if the more than a threshold quantity of the items leaves the new area. At step 800, an application in a handheld device carried by an employee detects items near the employee. Such an application can be activated by the user. As shown in FIG. 2, a handheld device 250 includes an RFID sensor 252 and/or a code capture sensor 254. In addition, the handheld device includes a display/input 256 which may take the form of a touch screen. RFID sensor 252 can sense radio signals from RFID tags 202 and 204. Code capture sensor 254 can read codes printed on merchandise such as barcodes and codes printed on shelf labels. Display/input 256 can display item names as discussed further below.

Figure 9:
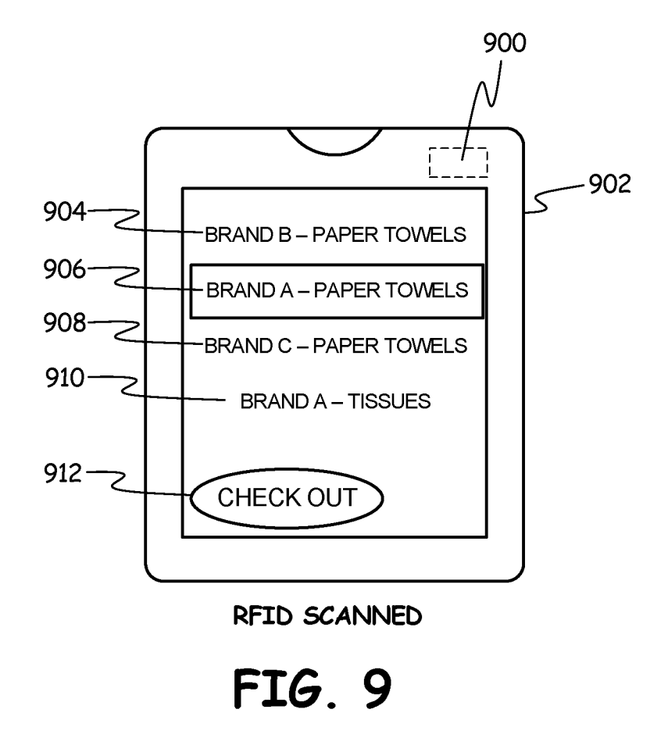
FIG. 9 is an example of a handheld device having a user interface for checking out merchandise.
Figure 10:
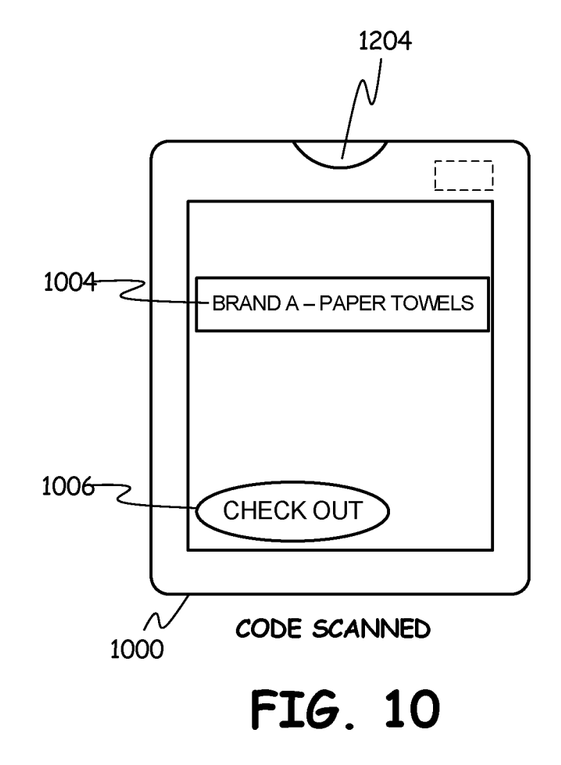
FIG. 10 is an example of a handheld device showing a user interface for checking out merchandise.

At step 802, the handheld device displays the names of the items that it has detected and provides the user with a selectable button to check out one or more of the detected items. FIGS. 9 and 10 provide examples of user interfaces that allow a user to select an item and to check out the selected item. In FIG. 9, RFID sensor 900 of handheld device 902 has detected a set of items and in response has displayed detected item names 904, 906, 908 and 910. The user may select an item by touching the touchscreen over the item's name at which point the item's name will be highlighted. For example, in FIG. 9, item name 906 has been highlighted as indicated by the box around item name 906. If desired, the user may select more than one item by touching additional item names on the touch screen. When the user is finished selecting items, the user may press a CHECK OUT button 912 to check out the selected items.

In FIG. 10, handheld device 1000 includes a code reader 1002, which has been used to scan an item. As a result of the scanning, item name 1004 appears on handheld device 1000 and is highlighted. The user can then check out the item by selecting CHECK OUT button 1006.

The item names that were selected to be checked out are provided by handheld device 250 to a handheld server 260, which then stores the item names in checkout database 230 at step 804 to indicate that the items have been checked out and to thereby disable alerts for those items.

At step 806, an employee moves items that have been checked out. At step 808, theft detection unit 216 detects that more than a threshold quantity of the items have been moved based on changes in movement database 214. Theft detection unit 216 then looks at checkout database 230 to determine if the moved items have been checked out. Since the items were checked out, theft detection unit 216 suppresses any alerts based on the movement. In accordance with one embodiment, suppressing such an alert involves theft detection unit 216 not indicating to alert control 218 that items have moved.

At step 810, handheld device 250 detects items that are near the employee that have previously been checked out. This can be done by using RFID sensors 252 to sense RFID tags 202, 204 that are near the handheld device and comparing the detected items to items in checkout database 230 through handheld server 260. Alternatively, an item can be scanned using code capture 252 on handheld device 250 and the scanned item can be compared to checked out items in checkout database 230 through a handheld server 260.

Figure 11:
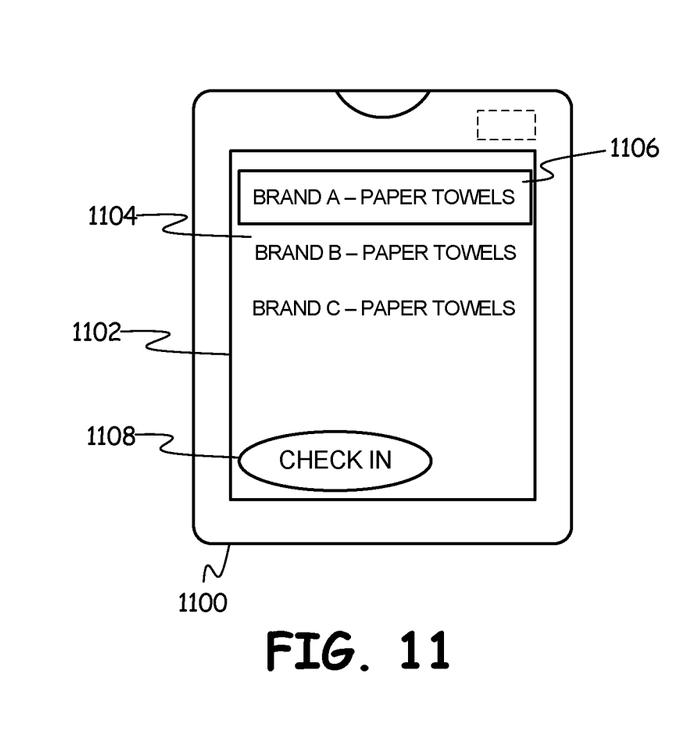
FIG. 11. is an example of a handheld device having a user interface for checking in merchandise.

At step 812, the employee can select items to check in. FIG. 11 provides an example of a handheld device 1100 with a user interface 1102 used by the user to check in items. User interface 1102 is produced by a check-in application that is activated by the user on handheld device 1100. On user interface 1102, a list 1104 of detected items that have previously been checked out is provided to the user. A user may select one of the item names in the list by tapping on the screen over the item name. When an item is selected by the user it is highlighted on the screen. For example, in FIG. 11, item 1106 is highlighted as having been selected by the user. More than one item may be selected by tapping on multiple items displayed on screen 1102. To check a highlighted item back in, the user selects CHECK IN button 1108. After an item has been checked in, it is removed from list 1104.

Figure 12:
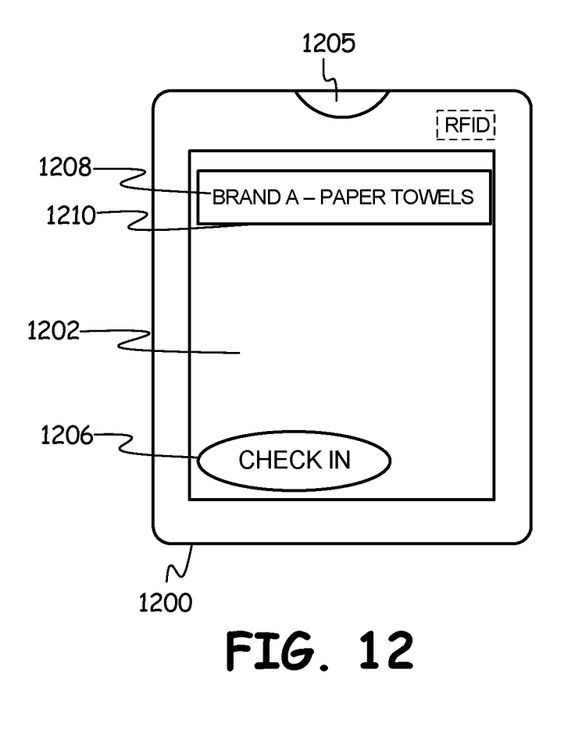
FIG. 12 is an example of a handheld device having a user interface for checking in merchandise.

FIG. 12 provides an alternative handheld device 1200 with a touch screen showing a user interface 1202 for checking in an item that has been scanned using code reader 1204. User interface 1202 is produced by a check in application that has been activated by the user of handheld device 1200. After a user scans a code on an item using code reader 1204, the item's name appears highlighted on screen 1202 such that the user can check in the item by simply selecting CHECK IN button 1206. For example, in FIG. 12, item name 1208 appears highlighted as indicated by highlighting box 1210.

When an item is checked in, handheld server 260 updates checkout database 230 to indicate that the item has been checked in. Returning to FIG. 8, at step 814, RFID sensors such as sensors 206, 208 sense the RFID tags on the items that have been checked back in. The RFID sensors in the new location where the items are now positioned transmit identifiers for the items to sensor application 210, which updates movement database 214 to indicate the new location of the items. Since the items have been checked in, any movement out of the new location will cause an alert to be issued unless the alert is suppressed through one of the techniques described above.

Figure 13:
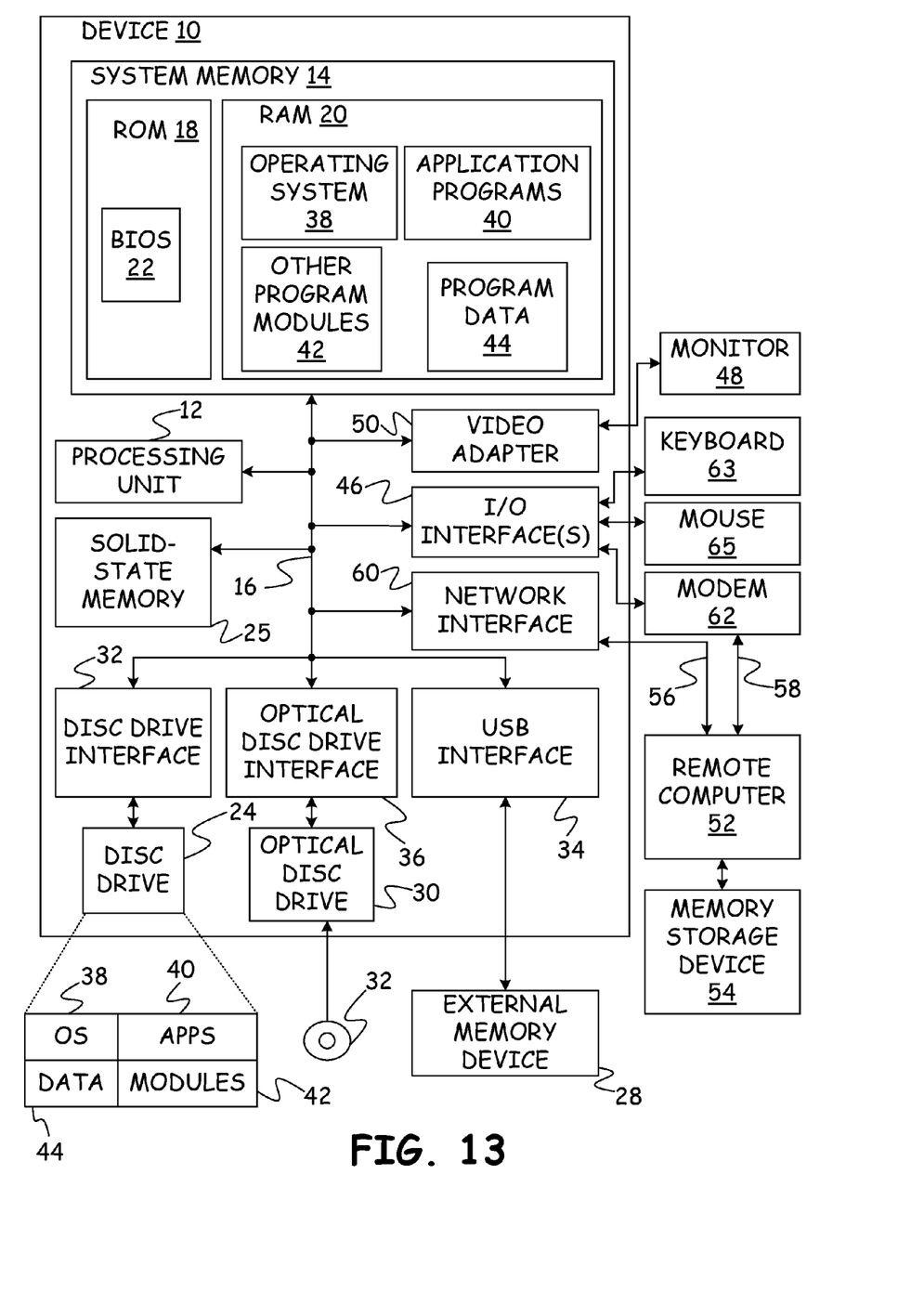
FIG. 13 is a block diagram of a computing device that may be used as one of the servers or handheld devices used to implement the various embodiments.

An example of a computing device that can be used as a server and/or handheld device in the various embodiments is shown in the block diagram of FIG. 13. The computing device 10 of FIG. 13 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18.

Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, a solid-state memory 25, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid state memory and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives, solid state memory 25 and RAM 20, including an operating system 38, one or more application programs 40, other program modules 42 and program data 44. For example, application programs 40 can include instructions for performing the steps described above for detecting RFID signals, scanning codes, tracking movement of items, detecting if a theft is occurring, suppressing alerts, issuing alerts, checking items out and checking items in.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

Computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 13. The network connections depicted in FIG. 13 include a local area network (LAN) 56 and a wide area network (WAN) 58. Such network environments are commonplace in the art.

Computing device 10 is connected to the LAN 56 through a network interface 60. Computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 13 are exemplary and other means for establishing a communications link between the computers, such as a wireless interface communications link, may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   storing a value in memory indicating that an alert is to be issued if more than a threshold quantity of an item is moved out of a location;
   storing in memory instructions to employees to remove more than the threshold quantity of the item from the location;
   receiving a signal from at least one sensor indicating that an item has been moved out of the location;
   using at least one of an identifier for the item and an identifier for the location to find the instructions to remove more than the threshold quantity of the item from the location; and
   in response to finding the instructions, suppressing an alert that would otherwise be issued because more than the threshold quantity of the item was removed from the location.

2. The method of claim 1 wherein the instructions to employees to remove more than the threshold quantity of the item from the location comprises an entry in a task database that identifies the location, the item, at least one date and an instruction to remove the item from the location.

3. The method of claim 1 wherein the instructions to employees to remove more than the threshold quantity of the item from the location comprises a list of items that are to be in the location wherein the list does not include the item that was removed from the location.

4. The method of claim 3 wherein the list of items is associated with a planogram that describes how items in the list are to be positioned at the location.

5. The method of claim 1 wherein receiving a signal from at least one sensor comprises receiving a signal from an RFID sensor.

6. The method of claim 1 further comprising:
   storing a value in memory indicating that an alert is to be issued if more than a threshold quantity of a further item is moved out of a location;
   receiving a signal from at least one sensor indicating that at least one of the further item has been moved out of the location;
   using at least one of an identifier for the further item and an identifier for the location to search for instructions to remove more than the threshold quantity of the further item from the location;
   in response to not finding instructions to remove more than the threshold quantity of the further item from the location, allowing an alert to be issued.

7. The method of claim 1 wherein finding the instructions to remove more than the threshold quantity of the item from the location further comprises locating a value associated with the instructions that indicates whether an employee has indicated that the employee is executing the instructions and only suppressing the alert if the value associated with the instructions indicates that an employee has indicated that the employee is executing the instructions.

8. A non-transitory computer-readable storage medium having stored thereon computer-executable instructions that when executed by a processor cause the processor to perform steps comprising:
   receiving a signal from at least one sensor indicating that an item is no longer within an area;
   using an identifier for the item to search a memory for plans to remove more than a specified number of the item from the area; and
   in response to locating the plans, not sending an alert that would otherwise be sent because more than the specified number of the item was removed from the area.

9. The non-transitory computer-readable storage medium of claim 8 wherein using the identifier for the item to search the memory comprises searching a stocking guide for the identifier, wherein the stocking guide describes what items are to be positioned within the area.

10. The non-transitory computer-readable storage medium of claim 9 wherein not locating the identifier for the item in the stocking guide constitutes locating plans to remove more than the specified number of the item from the area.

11. The non-transitory computer-readable storage medium of claim 8 wherein using the identifier for the item to search the memory comprises searching the memory for a task that involves removing the item from the area.

12. The non-transitory computer-readable storage medium of claim 11 wherein locating the plans comprises locating a task that has been assigned to an employee to be performed on the same day as the day the signal was received.

13. The non-transitory computer-readable storage medium of claim 12 wherein locating the plans further comprises locating a task that has been marked as being at least started by the employee.

14. The non-transitory computer-readable storage medium of claim 8 wherein the steps further comprise:
receiving an additional signal from at least one sensor indicating that a different item is no longer within the area;
using an identifier for the different item to search a memory for plans to remove more than a specified number of the different item from the area; and
in response to not locating plans to remove more than the specified number of the different item from the area, sending an alert that more than the specified number of the different item was removed from the area.

15. A system comprising:
a handheld device transmitting an indication that an employee has checked out an item;
a server receiving the indication that an employee has checked out an item from the handheld device and storing in memory the indication that the employee has checked out the item;
a sensor detecting that an item is not in an area and transmitting information indicating that the item is not in the area;
a sensor server receiving from the sensor the information indicating that the item is not in the area, accessing the memory to determine if an employee has checked out the item, and because the employee has checked out the item, suppressing an alert that would otherwise be sent.

16. The system of claim 15 wherein the employee checks out the item by selecting the item from a list of items displayed on the handheld device.

17. The system of claim 16 wherein the list of items displayed on the handheld device comprises items that are detected by the handheld device to be within a given radius of the handheld device.

18. The system of claim 15 wherein the employee checks out the item by capturing a code printed on the item.

19. The system of claim 15 wherein the server further receives an indication that the employee has checked the item in after checking the item out and the sensor server determines an area where the item was located when the employee checked the item in.

20. The system of claim 15 wherein the handheld device comprises a user interface that allows the employee to check out multiple items at the same time.

\* \* \* \* \*